(12) United States Patent
Smich

(10) Patent No.: US 11,402,246 B2
(45) Date of Patent: Aug. 2, 2022

(54) SIDE VIEW FLUID METER COUNTER ASSEMBLY AND A FLUID METER WITH A SIDE VIEW COUNTER

(71) Applicant: ROMET LIMITED, Mississauga (CA)

(72) Inventor: Andrew Smich, Mississauga (CA)

(73) Assignee: ROMET LIMITED, Mississauga (CA)

( * ) Notice: Subject to any disclaimer, the term of this patent is extended or adjusted under 35 U.S.C. 154(b) by 141 days.

(21) Appl. No.: 16/715,345

(22) Filed: Dec. 16, 2019

(65) Prior Publication Data

US 2020/0393280 A1 Dec. 17, 2020

Related U.S. Application Data

(60) Provisional application No. 62/860,978, filed on Jun. 13, 2019.

(51) Int. Cl.
| | |
|---|---|
| *G01F 1/07* | (2006.01) |
| *G01F 1/11* | (2006.01) |
| *G01D 4/06* | (2006.01) |
| *G01D 4/08* | (2006.01) |
| *G01D 4/00* | (2006.01) |

(Continued)

(52) U.S. Cl.
CPC .............. *G01F 1/07* (2013.01); *G01D 4/004* (2013.01); *G01D 4/06* (2013.01); *G01D 4/08* (2013.01); *G01F 1/11* (2013.01); *G01F 3/10* (2013.01); *G01F 15/022* (2013.01); *G01F 15/065* (2013.01)

(58) Field of Classification Search
CPC . G01F 5/065; G01F 5/022; G01F 1/11; G01F 1/07; G01F 1/053; G01D 4/06; G01D 4/004; G01D 4/08
See application file for complete search history.

(56) References Cited

U.S. PATENT DOCUMENTS 3,354,718 A * 11/1967 Boutillon ................ G01F 1/106
73/861.83
3,446,072 A * 5/1969 Siebold et al. ..... G01F 15/0755
73/198

(Continued)

OTHER PUBLICATIONS

Notification to go Through Formalities of Registration and to Grant Patent Right for Corresponding Chinese Utility Model Application No. 201920916354.9 Issued by the Chinese National Intellectual Property Administration in Chinese; 2 Pages.

(Continued)

*Primary Examiner* — Paul M. West

(57) ABSTRACT

A side view fluid meter counter assembly comprises a mounting bracket to mount a mechanical counter to an end of a fluid meter (e.g. gas meter) and a drive mechanism to drive a counter shaft of the mechanical counter from rotational movement of a rotationally driven member of the fluid meter. The rotationally driven member has a drive shaft extending in an end facing direction to connect to the drive mechanism and the mounting bracket mounts the mechanical counter in an orthogonal direction to the end facing direction such that a face of the mechanical counter is viewable from a side of the meter. The drive mechanism may comprise a worm drive. The drive mechanism may further comprise a pair of bevel gears. The mounting bracket further mounts the drive mechanism. Further provided is a fluid meter having a side view counter.

15 Claims, 4 Drawing Sheets

(51) Int. Cl.
  *G01F 3/10* (2006.01)
  *G01F 15/06* (2022.01)
  *G01F 15/02* (2006.01)

(56) References Cited

U.S. PATENT DOCUMENTS

| | | | |
|---|---|---|---|
| 7,171,852 B2 | 2/2007 | Smich et al. | |
| 2016/0042269 A1* | 2/2016 | Wang | G01F 15/07 |
| | | | 346/33 R |

OTHER PUBLICATIONS

International Search Report dated Jan. 29, 2020 Issued by the Canadian Intellectual Property Office for Corresponding International PCT Application No. PCT/CA2019/051816; 3 Pages.
Written Opinion Completed Jan. 24, 2020 by the Canadian Intellectual Property Office for Corresponding International PCT Application No. PCT/CA2019/051816; 4 Pages.

* cited by examiner

SIDE VIEW FLUID METER COUNTER ASSEMBLY AND A FLUID METER WITH A SIDE VIEW COUNTER

CROSS-REFERENCE

This application claims the domestic benefit of U.S. Provisional Application No. 62/860,978 filed Jun. 13, 2019, the content of which is incorporated in its entirety.

FIELD

The subject matter herein relates to gas or other fluid meter equipment and more particularly to a side view fluid meter counter assembly to mount a mechanical counter for viewing from a side of the fluid meter.

BACKGROUND

Gas meters, particularly for industrial use, include measurement devices to measure large volumes of gas. U.S. Pat. No. 7,171,852B2 issued Feb. 6, 2007 discloses a gas meter operations tracking assembly. The assembly mounts a mechanical counter to face an end of the gas meter. For many installations, an end facing counter is difficult to read. Often the meter is installed in a horizontal orientation and the end of the meter having the counter faces against a wall or other structure that makes viewing the counter difficult if not impossible. Only a very narrow gap may be available between the end where the backup counter faces and the wall.

SUMMARY

Improving readability of an operation counter for a fluid meter such as a gas meter may be desirable. The present disclosure provides a counter which is easy to read in a side view and provides a fluid meter which is more versatile in its ability to be mounted in locations (e.g. on walls, in piping system and in cabinets) where an end view counter is not visible.

In a first aspect, there is provided a side view fluid meter counter assembly, wherein the assembly comprises: a mounting bracket to mount a mechanical counter to an end of a fluid meter; and a drive mechanism to drive a counter shaft of the mechanical counter from a rotation of a driven member actuated by a flow of fluid through a housing of the fluid meter, the driven member having a drive shaft, extending externally to the housing in an end facing direction, to connect to the drive mechanism and the mounting bracket providing a surface to mount the mechanical counter in an transverse direction to the end facing direction such that a face of the mechanical counter is viewable from a side of the fluid meter.

The drive mechanism may comprise a worm drive.

The drive mechanism may comprise a pair of bevel gears in engagement. One of the pair of bevel gears is mounted to a transverse axel extending between the drive shaft and the driven member. The transverse axel may be mounted for rotation by the mounting bracket. The assembly may be wherein the mounting bracket comprises a pair of spaced arms to mount the transverse axel. The assembly may be wherein the mechanical counter is mounted to one of the pair of spaced arms. One of the pair of bevel gears may be mounted to the drive shaft of the mechanical counter.

The mechanical counter may define a first mechanical counter and the assembly may further couple to a second mechanical counter such that a drive shaft of the second mechanical counter extends to define the transverse axel and the second mechanical counter faces the end direction.

A worm gear may be mounted to the transverse axel for coupling to a worm driven by the driven member.

The may be wherein the end of the fluid meter defines a first end and the fluid meter comprises an electronic compensator mounted on a second end of the fluid meter opposite to the first end.

The fluid meter may comprise a counter housing to house the assembly and mechanical counter, the counter housing having a window through which the mechanical counter is visible.

The fluid meter may comprise a gas meter.

In a second aspect there is provided a fluid meter with a side view counter wherein a mechanical counter is coupled to the fluid meter via a side view fluid meter counter assembly such as in accordance with the first aspect herein.

Figure 1:
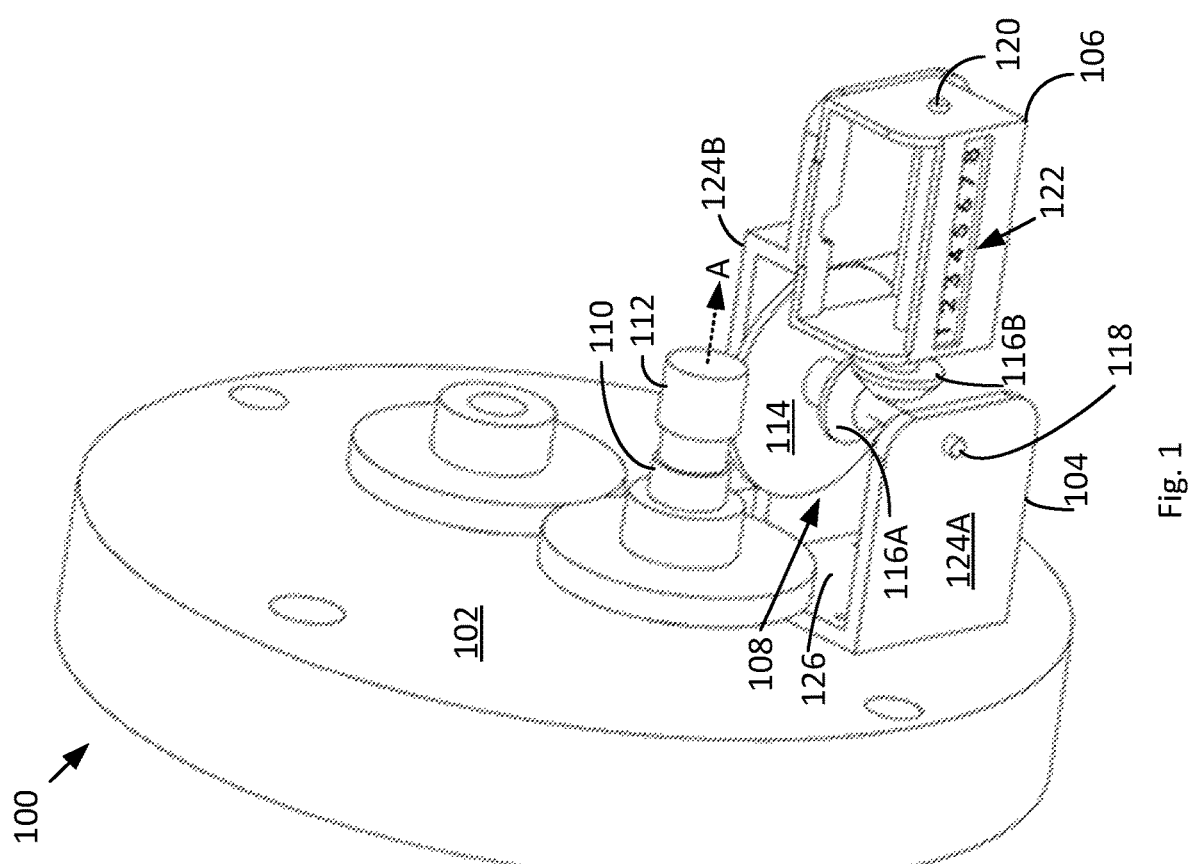
FIG. 1 is a perspective view of a first end of a gas meter showing a side view gas meter counter assembly mounting a mechanical counter to the first end in accordance with an example, where the remainder of the gas meter is not shown.

The present concept is best described through certain embodiments thereof, which are described herein with reference to the accompanying drawings, wherein like reference numerals refer to like features throughout. It is to be understood that the term invention, when used herein, is intended to connote the concept underlying the embodiments described below and not merely the embodiments themselves. It is to be understood further that the general concept is not limited to the illustrative embodiments described below and the following descriptions should be read in such light. More than one concept may be shown and described and each may standalone or be combined with one or more others unless stated otherwise.

DETAILED DESCRIPTION

Figure 2:
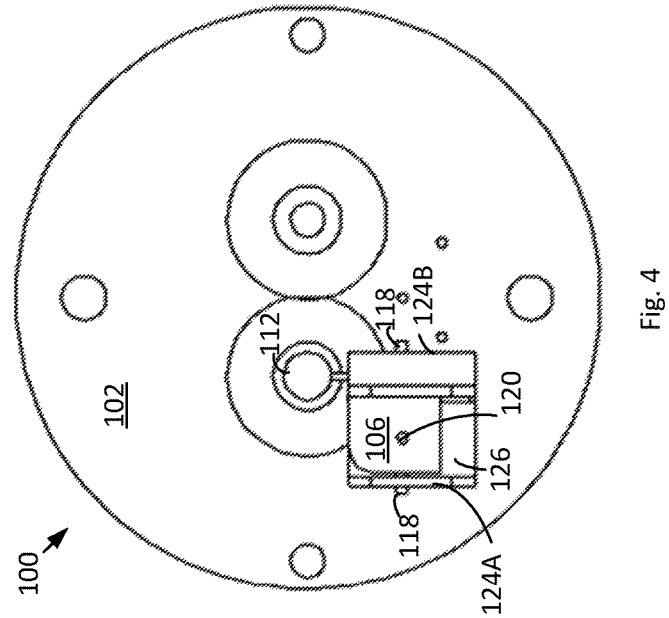
FIGS. 2-4 are a top view, a side view and an end view of FIG. 1.
Figure 4:
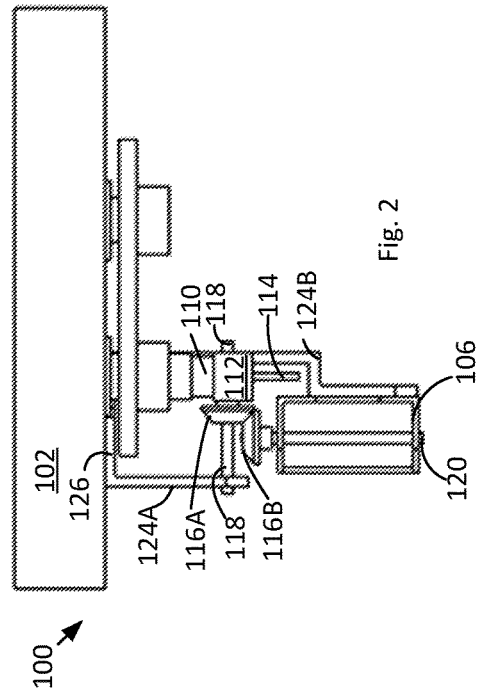
Figure 3:
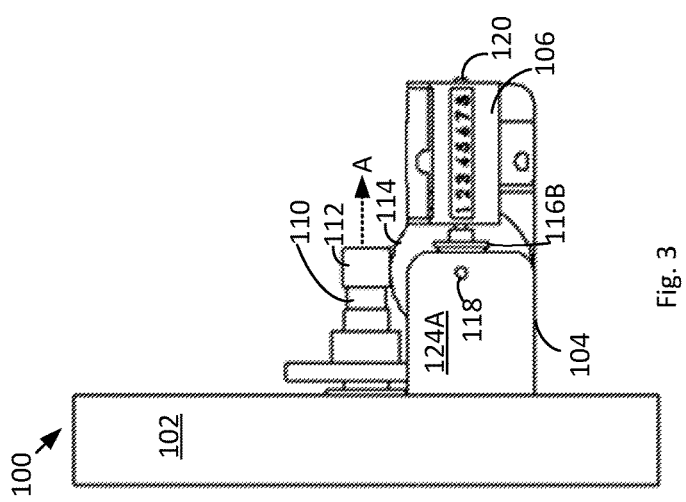
Figure 7:
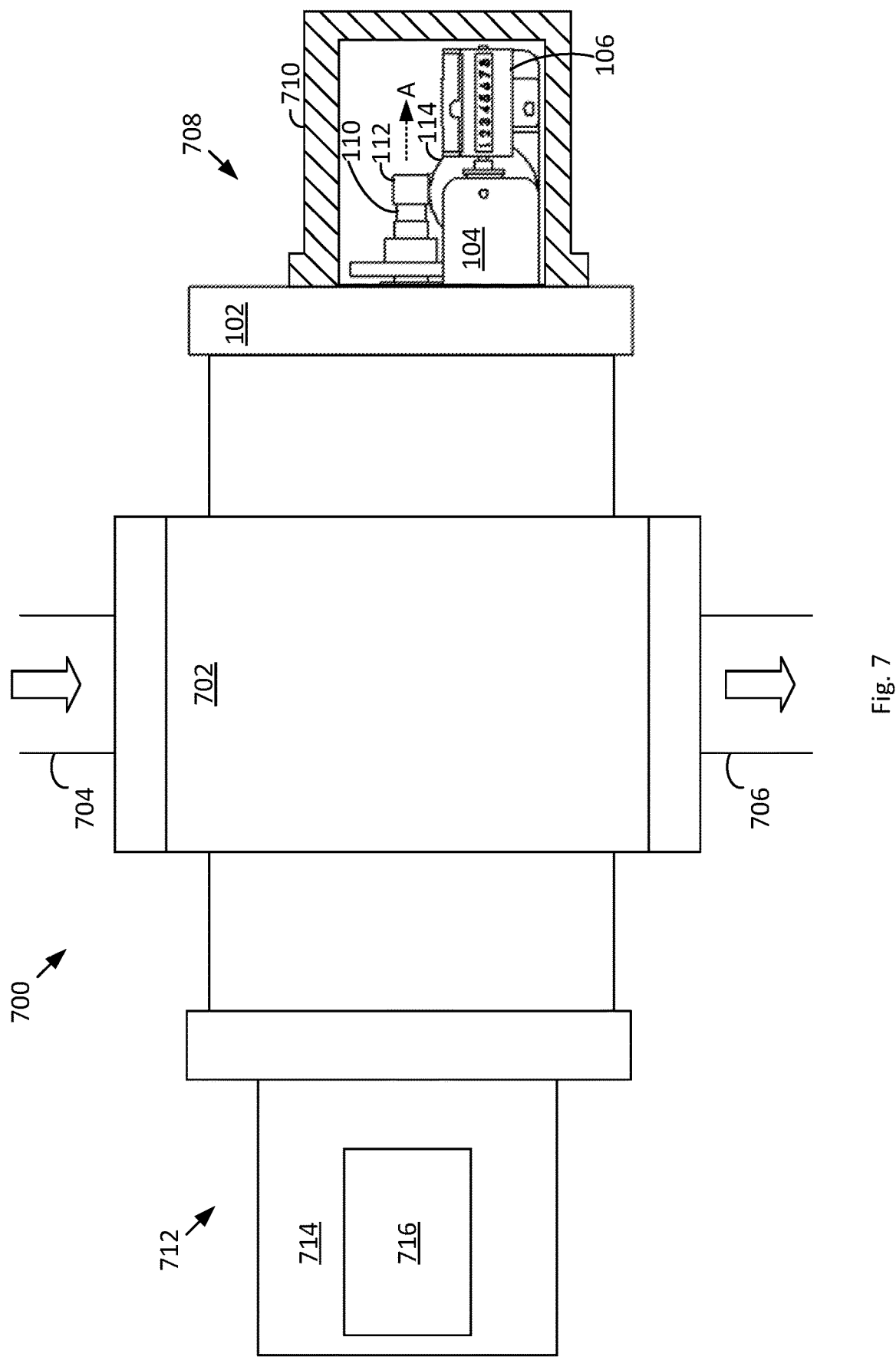
FIG. 7 is a side view of a gas meter with side view counter in accordance with an example.

Reference is directed to FIG. 1. There is shown a perspective view of a first end of a gas meter 100 showing a side view gas meter counter assembly mounting a mechanical counter to an end plate 102 of the gas meter 100 in accordance with an example, where the remainder of the gas meter is not shown. FIGS. 2-4 show a top view, side view and end view of the example of FIG. 1. FIG. 7 shows a side view of a gas meter, in accordance with an example, with a side view counter where the side view counter is in accordance with the example of FIGS. 1-4.

A mounting bracket 104 mounts a mechanical counter 106 to end plate 102 in a side facing direction. That is, a dotted arrow A points in an end facing direction and the side facing direction is generally transverse or orthogonal (at 90°) to the end facing direction. Mounting bracket 104 further mounts a drive mechanism 108 in the present example, as further described.

Though not shown, it is readily understood that gas meter 100 comprises one or more rotationally driven members (e.g. impellers) housed internally in the gas meter. A flow of gas through the meter rotates the rotationally driven members such as on respective shafts. At least one of such shafts may define or be coupled to a drive shaft 110 that extends through end plate 102. An end (or other portion) of the drive shaft 110 may have a drive worm 112 (e.g. in the form of a screw) as a component of a worm drive for driving the mechanical counter. In the example of FIGS. 1-4, drive worm 112 is coupled to worm gear 114 (e.g. a wheel) mounted on transverse shaft 118. A pair of bevel gears 116A and 116B translate the rotational movement of transverse shaft 118 to drive a counter shaft 120 of mechanical counter 106. Counter shaft 120 rotates counter wheels of mechanical counter 106 to change the display of the counter. Here, an 8 digit counter having a display face 122 is shown. The counter may have more or fewer digits. The counter wheels of mechanical counter 106 (or any counter herein) are not fully shown for reasons of simplicity. Similarly, the grooves or teeth of the worm drive components and the pair of bevel gears 116A, 116B are also not shown in any of the drawings for simplicity.

Mounting bracket 104 has a pair of spaced arms 124A and 124B. Transverse shaft 118 may be mounted such as in apertures or other structure formed or carried, etc. in the pair of spaced arms 124A and 124B. One arm (e.g. 124B) may extend further than the other (e.g. 124A) to provide a surface on which to mount mechanical counter 106 with its face 122 facing the side of the gas meter. Mounting bracket 104 may have a middle portion 126 (e.g. between the arms 124A and 124B) for mounting to end plate 102 via fasteners, or other manner(s). Mounting bracket 104 is roughly U shaped with a broader bottom and one longer arm. Mounting bracket 104 has a simple configuration to permit easy manufacture (e.g. by stamping and bending).

In the example of FIGS. 1-4, mechanical counter 106 has its counter shaft 120 that is parallel to the drive shaft 110 so that when the gas meter is mounted horizontally, the mechanical counter is horizontal. However, a vertical mounting of the gas meter may also be used and the counter viewed from the side but in a vertical orientation.

It will be further understood with reference to FIG. 1 that bevel gear 116B could be oriented with a 90 rotation (e.g. clockwise or counter clockwise) such that counter shaft 120 is orthogonal to drive shaft 110. Mounting bracket 104 may be adapted to provide a surface to mount the mechanical counter in the different (rotated) orientation.

Figure 5:
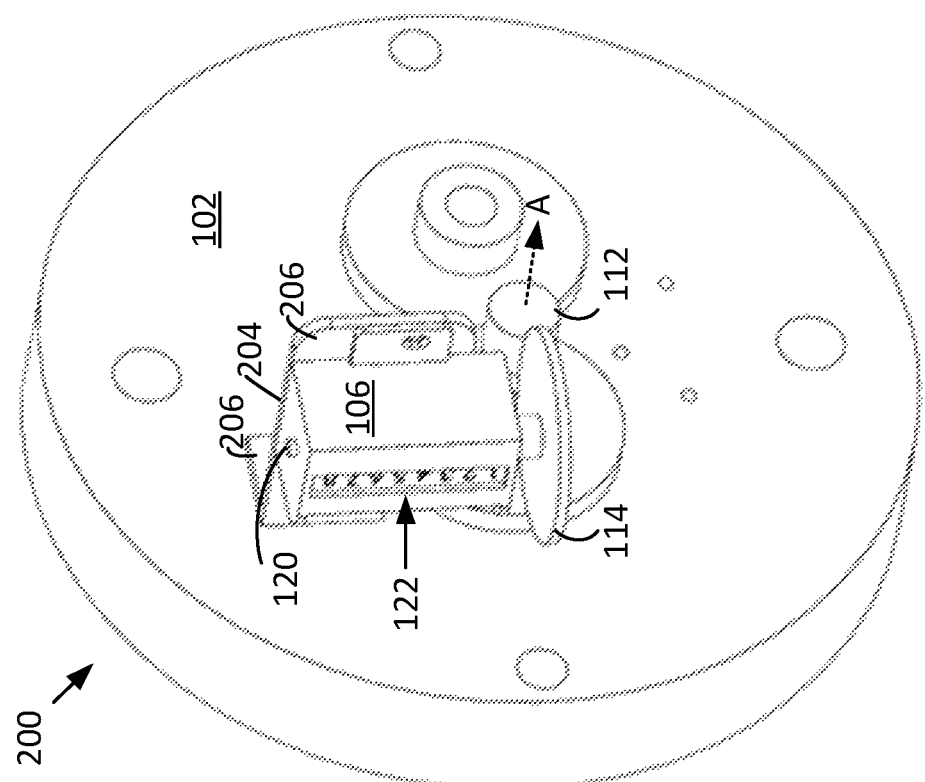
FIG. 5 is a perspective view of a first end of a gas meter showing a side view gas meter counter assembly mounting a mechanical counter to the first end in accordance with another example, where the remainder of the gas meter is not shown.

FIG. 5 is a perspective view of a first end of a gas meter 200 showing a side view gas meter counter assembly mounting a mechanical counter to the first end in accordance with another example, where the remainder of the gas meter is not shown. In the present example, mounting bracket 204 has a different configuration from mounting bracket 104. Spaced arms are not employed. Mounting bracket 204 is generally L shaped with one portion 206 mounting to end plate 102 and the other portion 208 to mechanical counter 106.

In the present example, the worm drive components (112, 114) are similar to those of FIGS. 1-4 but they are differently mounted such that worm gear 114 is differently oriented to drive worm 112. In this way, a pair of bevel gears is not utilized. Counter shaft 120 of mechanical counter 106 is orthogonal to drive shaft 110 yet the face 122 is also transvers to end direction A. It is understood that mechanical counter 106 could be positioned in a mirrored manner with mechanical counter 106 located below worm gear 114 and the face 122 presenting in the same direction to the side. The mounting bracket 204 may be repositioned accordingly.

Figure 6:
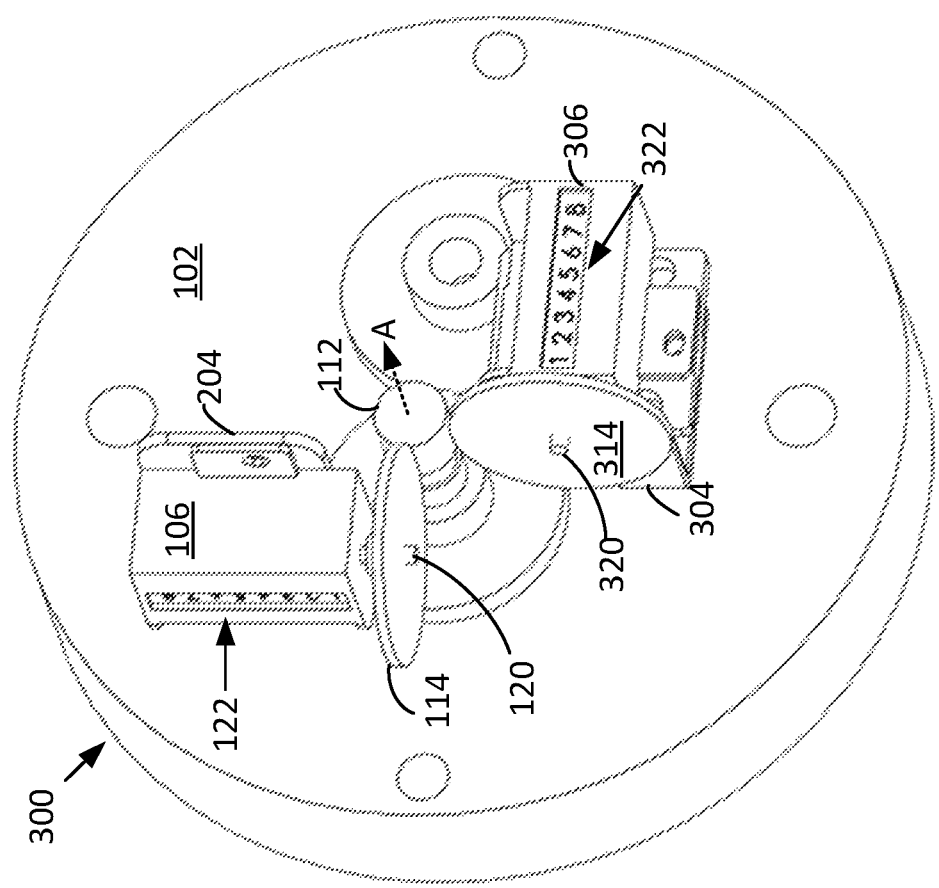
FIG. 6 is a perspective view of a first end of a gas meter showing a side view gas meter counter assembly mounting a first mechanical counter to the first end according to the example of FIG. 5 as well as an end view gas meter counter assembly mounting a second mechanical counter in accordance with an example, where the remainder of the gas meter is not shown.

FIG. 6 is a perspective view of a first end of a gas meter 300 showing a side view gas meter counter assembly mounting a first mechanical counter 106 to the first end, according to the example of FIG. 5, as well as an end view gas meter counter assembly having a mounting bracket 304 mounting a second mechanical counter 306 in accordance with an example, where the remainder of the gas meter is not shown. In the present example, worm gear 314 drives counter shaft 320. A face 322 of the second mechanical counter 304 is in the same direction as end direction A. Viewing is enabled from both a side and an end of the gas meter. The two counters are driven by a same driven member to stay synchronized.

Though not shown, the example of FIGS. 1-4 may be adapted to present a second mechanical counter facing in the end direction A. A second mechanical counter (e.g. 306) may be mounted similarly to that shown in FIG. 6. However, its counter shaft 320 may extend to define transverse shaft 118. In this way, one worm gear drives both mechanical counters 106 and 306.

In the respective examples, there is provided a side view gas meter counter assembly comprising a mounting bracket to mount a mechanical counter to an end of the gas meter and a drive mechanism to drive a counter shaft of the mechanical counter from rotation of a driven member of the gas meter. The driven member has a drive shaft extending in an end facing direction to connect to the drive mechanism and the mounting bracket mounts the mechanical counter in an transverse direction to the end facing direction such that a face of the mechanical counter is viewable from a side of the gas meter.

FIG. 7 is a simplified illustration of a (positive displacement) gas meter 700 with side view counter in accordance with an example. In the present example, gas meter 700 is configured with a side view gas meter counter assembly with a mechanical counter as shown in FIGS. 1-4. Gas meter 700 is shown with a housing 702 coupled to an inlet conduit at 704 and an outlet conduit at 706 with a through flow of gas as indicated by the arrows. Housing 702 houses a driven member (or more than one) such as lobed impellers (not shown) that rotate on respective drive shafts actuated in response to the flow of gas.

The side view gas meter counter assembly and the mechanical counter 106 are mounted at a first end 708. Shown cut away is a housing 710 for the side view gas meter counter assembly and the mechanical counter 106. Housing 710 may have a window (not shown) through which to view mechanical counter 106.

At an opposite end (e.g. a second end) 712 to the first end is a housing 714 for a compensator (not shown) with a display 716. The compensator may comprise an electronic, mechanical, electro-mechanical compensator or any combination thereof.

It is understood that to read a volume of gas using the mechanical counter (106, 206 or 306) as mounted according to the disclosure herein a multiplier (e.g. a conversion factor) is used. The conversion factor is proportional to the size of the gas meter and the gear ratio (gas volume displacement) used in the gear combination which couples the rotationally driven members (e.g. impellers) with the mechanical counter (106, 206 or 306).

In each of the examples described herein, whether illustrated or not, the components of the counter assembly and counter may be made of metal or a strong (e.g. resistant) plastic. The mechanical counter shown can be any commercially available counter (e.g. those manufactured by Veeder-Root Inc. of Connecticut, U.S.A.).

In each of the examples described herein, whether illustrated or not, a counter end housing for the gas meter may be provided to securely house the end of the gas meter. The counter end housing protects the mechanical counter and its assembly as well as prevents tampering. The counter end housing may have a viewing window through which the mechanical counter may be viewed.

The gas meter may comprise a conventional positive displacement rotary gas meter. Examples include the AdEM and ECM2 models (e.g. sold under the trademarks AdEM-S, AdEM-T, AdEM-PTZ, ECM2-PTZ, etc.) available from Romet Limited. It should be understood that the assembly could be utilized with any type of gas meter. An opposite end of the gas meter (or other location) may comprise electronic components of an electronic compensator providing an electronic counter which counter compensates for changes in the density of the gas due to fluctuations in temperature, as flow data is being recorded.

While the present description is being provided assuming that medium of natural gas, it should be understood that the positive displacement meter could be used to measure any type of gas or other fluid.

In the examples shown herein, the end plate 102 is configured for two (e.g. lobed) impellers though only one has a shaft or connecting member extending through the end plate 102. The other impeller or both may have such shafts and the worm drive configured accordingly. It should be understood that other embodiments are contemplated.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise. Herein, "A and/or B" means A or B or both A and B.

Features, integers, characteristics, etc. described in conjunction with a particular aspect, embodiment or example are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings).

What is claimed is:

1. A side view fluid meter counter assembly comprising:
   a mounting bracket to mount a mechanical counter to an end of a fluid meter; and
   a drive mechanism to drive a counter shaft of the mechanical counter from a rotation of a driven member actuated by a flow of fluid through a housing of the fluid meter, the driven member having a drive shaft, extending externally to the housing in an end facing direction, to connect to the drive mechanism and the mounting bracket providing a surface to mount the mechanical counter in an transverse direction to the end facing direction such that a face of the mechanical counter is viewable from a side of the fluid meter;
   wherein the drive mechanism comprises a worm drive and a pair of bevel gears in engagement;
   wherein one of the pair of bevel gears is mounted to a transverse axel extending between the counter shaft and the driven member;
   wherein the mounting bracket comprises a pair of spaced arms to mount the transverse axel for rotation; and;
   wherein the mechanical counter is mounted to one of the pair of spaced arms.

2. The assembly of claim 1 wherein one of the pair of bevel gears is mounted to the counter shaft of the mechanical counter.

3. The assembly of claim 1, wherein the mechanical counter defines a first mechanical counter and the assembly further couples to a second mechanical counter such that a counter shaft of the second mechanical counter extends to define the transverse axel and the second mechanical counter faces the end direction.

4. The assembly of claim 1 wherein a worm gear is mounted to the transverse axel for coupling to a worm driven by the driven member.

5. The assembly of claim 1 wherein the end of the fluid meter defines a first end and the fluid meter comprises an electronic compensator mounted on a second end of the fluid meter opposite to the first end.

6. The assembly of claim 1 wherein the fluid meter comprises a counter housing to house the assembly and mechanical counter, the counter housing having a window through which the mechanical counter is visible.

7. The assembly of claim 1 wherein the fluid meter comprises a gas meter.

8. A fluid meter with a side view counter comprising a mechanical counter coupled in the fluid meter via a side view fluid meter counter assembly, the assembly comprising:
   a mounting bracket to mount the mechanical counter to an end of the fluid meter; and
   a drive mechanism to drive a counter shaft of the mechanical counter from a rotation of a driven member actuated by a flow of fluid through a housing of the fluid meter, the driven member having a drive shaft, extending externally to the housing in an end facing direction, to connect to the drive mechanism and the mounting bracket providing a surface to mount the mechanical counter in an transverse direction to the end facing direction such that a face of the mechanical counter is viewable from a side of the fluid meter;

wherein the drive mechanism comprises a worm drive and a pair of bevel gears in engagement;

wherein one of the pair of bevel gears is mounted to a transverse axel extending between the counter shaft and the driven member;

wherein the mounting bracket comprises a pair of spaced arms to mount the transverse axel for rotation; and;

wherein the mechanical counter is mounted to one of the pair of spaced arms.

9. The fluid meter with a side view counter of claim 8 wherein one of the pair of bevel gears is mounted to the counter shaft of the mechanical counter.

10. The fluid meter with a side view counter of claim 8 wherein the mechanical counter defines a first mechanical counter and the assembly further couples to a second mechanical counter such that a counter shaft of the second mechanical counter extends to define the transverse axel and the second mechanical counter faces the end direction.

11. The fluid meter with a side view counter of claim 8 wherein a worm gear is mounted to the transverse axel for coupling to a worm driven by the driven member.

12. The fluid meter with a side view counter of claim 8 wherein the end of the fluid meter defines a first end and the fluid meter comprises an electronic compensator mounted on a second end of the fluid meter opposite to the first end.

13. The fluid meter with a side view counter of claim 8 wherein the fluid meter comprises a counter housing to house the assembly and mechanical counter, the counter housing having a window through which the mechanical counter is visible.

14. The fluid meter with a side view counter of claim 8 wherein the fluid meter comprises a gas meter.

15. A side view fluid meter counter assembly comprising:

a mounting bracket to mount a mechanical counter to an end of a fluid meter; and a drive mechanism to drive a counter shaft of the mechanical counter from a rotation of a driven member actuated by a flow of fluid through a housing of the fluid meter, the driven member having a drive shaft, extending externally to the housing in an end facing direction, to connect to the drive mechanism and the mounting bracket providing a surface to mount the mechanical counter in an transverse direction to the end facing direction such that a face of the mechanical counter is viewable from a side of the fluid meter;

wherein the drive mechanism comprises a worm drive and a pair of bevel gears in engagement;

wherein one of the pair of bevel gears is mounted to a transverse axel extending between the counter shaft and the driven member; and wherein the mechanical counter defines a first mechanical counter and the assembly further couples to a second mechanical counter such that a counter shaft of the second mechanical counter extends to define the transverse axel and the second mechanical counter faces the end direction.

* * * * *